United States Patent [19]
Uetake

[11] 4,184,747
[45] Jan. 22, 1980

[54] MICROSCOPE OBJECTIVE

[75] Inventor: Toshifumi Uetake, Hachiouji, Japan

[73] Assignee: Olympus Optical Co., Limited, Tokyo, Japan

[21] Appl. No.: 839,742

[22] Filed: Oct. 5, 1977

[30] Foreign Application Priority Data

Oct. 14, 1976 [JP] Japan .................. 51-123160

[51] Int. Cl.² ............................................ G02B 9/60
[52] U.S. Cl. .............................. 350/175 ML; 350/216
[58] Field of Search ............ 350/175 ML, 176, 177, 350/216

[56] References Cited

U.S. PATENT DOCUMENTS

| | | | |
|---|---|---|---|
| 3,428,389 | 2/1969 | Judd | 350/177 |
| 3,481,665 | 12/1969 | Rosenberger | 350/175 ML |
| 3,497,290 | 2/1970 | Rosenberger | 350/216 X |
| 3,537,772 | 11/1970 | Shoemaker | 350/176 |
| 3,598,474 | 8/1971 | Shoemaker | 350/176 |
| 3,879,111 | 4/1975 | Goto | 350/175 ML |
| 3,902,793 | 9/1975 | Shoemaker | 350/216 |

*Primary Examiner*—Paul A. Sacher
*Attorney, Agent, or Firm*—Cushman, Darby & Cushman

[57] ABSTRACT

A microscope objective comprising a first, second, third, fourth and fifth lens components, in which the first lens component is a negative meniscus lens, the second lens component is a positive meniscus lens, the third and fourth lens components are positive cemented doublets and the fifth lens component is a negative cemented meniscus doublet, and for which the numerical aperture is large and the image becomes flat toward marginal portion.

11 Claims, 10 Drawing Figures

MICROSCOPE OBJECTIVE

BACKGROUND OF THE INVENTION a. Field of the Invention

The present invention relates to a microscope objective and, more particularly, to a microscope objective of achromat class for which flatness of image is high.

b. Description of the Prior Art

For most of known microscope objectives of this kind, the image is flat only at the middle portion and is not satisfactorily flat toward the marginal portion. Besides, for known microscope objectives of this kind for which the image is flat for a comparatively wide range, the numerical aperture is small.

SUMMARY OF THE INVENTION

It is, therefore, a primary object of the present invention to provide a microscope objective for which the numerical aperture is large, i.e., N.A.=0.7, and for which offaxial aberrations are corrected more favourably so that the image becomes flat toward the marginal portion as well as in the middle portion.

The microscope objective according to the present invention has lens configuration as shown in FIG. 1. It comprises five lens components, i.e., the first, second, third, fourth and fifth lens components from the object side in which the first lens component is a thick negative meniscus lens arranged concave toward the object side, the second lens component is a positive meniscus lens arranged concave toward the object side, the third lens component is a cemented doublet having positive refractive power, the fourth lens component is also a cemented doublet having positive refractive power, and the fifth lens component is a negative cemented meniscus doublet arranged concave toward the image side. Besides, the microscope objective according to the present invention satisfies the following conditions:

$$1.75 \leq \frac{n_1 - 1}{r_1} / \frac{n_1 - 1}{r_2} \leq 1.95 \tag{1}$$

$$1.45 \leq n_1 d_1 / f \leq 2.15 \tag{2}$$

$$1.25 \leq \frac{n_8 - 1}{r_{13}} / \frac{n_7 - 1}{r_{11}} \leq 1.55 \tag{3}$$

$$1.30 \leq \frac{n_7 d_{11} + n_8 d_{12}}{f} \leq 2.35 \tag{4}$$

$$-0.05 \leq \frac{n_3 - 1}{r_5} f \leq 0.050 \tag{5}$$

$$3.0 \leq \frac{d_{10}}{f} \leq 5.0 \tag{6}$$

$$90 \leq [(\nu_4 - \nu_3) + (\nu_6 - \nu_5)] \leq 120 \tag{7}$$

wherein reference symbol f represents the focal length of the lens system as a whole, reference symbols $r_1$ and $r_2$ respectively represent radii of curvature of respective surfaces of the first lens component, reference symbol $r_5$ represents the radius of curvature of the surface on the object side of the third lens component, reference symbols $r_{11}$ and $r_{13}$ respectively represent radii of curvature of the surface on the object side and surface on the image side of the fifth lens component, reference symbol $d_1$ represents the thickness of the first lens component, reference symbols $d_{11}$ and $d_{12}$ respectively represent thicknesses of respective lenses constituting the fifth lens component, reference symbol $d_{10}$ represents the airspace between the fourth and fifth lens components, reference symbol $n_1$ represents the refractive index of the first lens component, reference symbol $n_3$ represents the refractive index of the lens on the object side in the third lens component, reference symbols $n_7$ and $n_8$ respectively represent refractive indices of respective lenses constituting the fifth lens component, reference symbols $\nu_3$ and $\nu_4$ respectively represent Abbe's numbers of respective lenses constituting the third lens component, and reference symbols $\nu_5$ and $\nu_6$ respectively Abbe's numbers of respective lenses constituting the fourth lens component.

Out of the above conditions, the conditions (1) and (2) are to define the refractive power and bending of the first lens component, which is a negative miniscus single lens. In combination with the conditions (3) and (4) to be explained later, these conditions also serve to eliminate curvature of field by correcting Petzval's sum of the lens system as a whole and, moreover, to favourably correct spherical aberration and coma of the lens system as a whole. If the value defined by the condition (1) becomes larger than the upper limit of the condition (1), curvature of field will be overcorrected and coma by spherical aberration of skew rays will be undercorrected. If the value defined by the condition (1) becomes smaller than the lower limit, curvature of field will be undercorrected and coma will be overcorrected. If the value defined by the condition (2) becomes larger than the upper limit of the condition (2), curvature of field will be undercorrected and coma by skew rays will be overcorrected. If the value defined by the condition (2) becomes smaller than the lower limit, curvature of field will be overcorrected and coma by skew rays will be undercorrected.

The conditions (3) and (4) are to define the refractive power and bending of the fifth lens component, which is a negative cemented meniscus doublet. In combination with the above-mentioned conditions (1) and (2), these conditions serve to eliminate curvature of field and astigmatic difference by correcting Petzval's sum. Besides, in combination with the condition (6), these conditions also serve to eliminate coma. If the value defined by the condition (3) becomes larger than the upper limit of the condition (3), curvature of field will be overcorrected, the astigmatic difference will be also overcorrected and zonal aberration of spherical aberration by skew rays will increase. If the value defined by the condition (3) becomes smaller than the lower limit, curvature of field and astigmatic difference will be undercorrected. If the value defined by the condition (4) becomes larger than the upper limit of the condition (4), curvature of field and astigmatic difference will be also overcorrected and spherical aberration by skew rays will increase. If the value defined by the condition (4) becomes smaller than the lower limit, curvature of field and astigmatic defference will be undercorrected.

The condition (5) is to define the bending of the third lens component, which is a positive cemented doublet. This condition mainly serves to correct the astigmatic difference favourably and secondarily serves to eliminate asymmetrical coma. If the value defined by the condition (5) becomes larger than the upper limit of the condition (5), the astigmatic difference will be undercorrected and it will become impossible to favourably correct the remaining astigmatic difference by the other factors. Moreover, asymmetrical inward coma will increase. If the value defined by the condition (5) becomes smaller than the lower limit, the astigmatic difference will be overcorrected and asymmetrical outward coma will increase.

The condition (6) is to define the airspace between the front lens group comprising the first, second, third and fourth lens components and rear lens group comprising the fifth lens component. This condition mainly serves to favourably correct asymmetrical coma by skew rays of the lens system as a whole. If the value defined by the condition (6) becomes larger than the upper limit of the condition (6), inward coma will tend to be caused. If the value defined by the condition (6) becomes smaller than the lower limit, outward coma will tend to be caused.

The condition (7) relates to the achromatic lenses in the front lens group and serves to favourably correct longitudinal chromatic aberration and lateral chromatic aberration of the lens system as a whole. If the value defined by the condition (7) becomes larger than the upper limit of the condition (7), longitudinal chromatic aberration by marginal rays of short wavelengths will be overcorrected too much when lateral chromatic aberration is satisfactorily corrected and will appear as flare in the image. As a result, contrast of the image will become unfavourable. If the value defined by the condition (7) becomes smaller than the lower limit, undercorrection of lateral chromatic aberration will become intolerably large when longitudinal chromatic aberration is satisfactorily corrected.

As explained so far, it is possible to attain the object of the present invention by the microscope objective having the afore-mentioned lens configuration and satisfying the above-mentioned respective conditions. But, it is more preferable to arrange so that the microscope objective according to the present invention further satisfies the following conditions (8) and (9).

$$-0.45 \leq \frac{n_2 - 1}{r_4} f \leq -0.25 \qquad (8)$$

$$-0.03 \leq \frac{n_5 - 1}{r_8} f \leq 0.075 \qquad (9)$$

wherein reference symbols $r_4$ represents the radius of curvature of the surface on the image side of the second lens component, reference symbol $r_8$ represents the radius of curvature of the surface on the object side of the fourth lens component, reference symbol $n_2$ represents the refractive index of the second lens component and reference symbol $n_5$ represents the refractive index of the lens on the object side in the fourth lens component.

Out of the above conditions, the condition (8) is to define the refractive power of the second lens component, which is a positive meniscus lens, and mainly serves to favourably correct spherical aberration and sine condition of the lens system as a whole. If the value defined by the condition (8) becomes larger than the upper limit of the condition (8), spherical aberration will be overcorrected and zonal aberration of sine condition will increase. If the value defined by the condition (8) becomes smaller than the lower limit, spherical aberration will be undercorrected. If it is attempted to correct spherical aberration by the other factors, zonal aberration will increase. Besides, the balance between the sine condition and spherical aberration will be disturbed and asymmetrical aberration by skew rays will be caused.

The condition (9) is to define the bending of the fourth lens component. This condition mainly serves to correct the astigmatic difference of the lens system like the aforementioned condition (5). As for correction of the astigmatic difference, the condition (5) is the primary condition and the condition (9) is the secondary condition. Therefore, for correction of the astigmatic difference, the condition (5) is more effective and more substantial compared with the condition (9). If the value defined by the condition (9) becomes larger than the upper limit of the condition (9), the astigmatic difference will be undercorrected and asymmetrical inward coma will increase. If the value defined by the condition (9) becomes smaller than the lower limit, the astigmatic difference will be overcorrected and asymmetrical outward coma will increase.

DETAILED DESCRIPTION OF THE PREFERRED EMBODIMENTS

Figure 1:
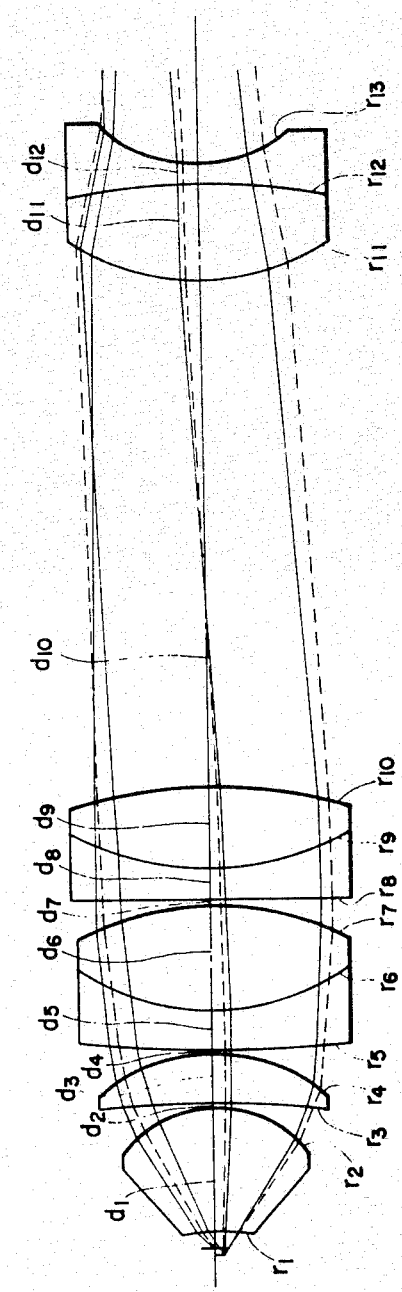
FIG. 1 shows a sectional view of the microscope objective according to the present invention.
Figure 2:
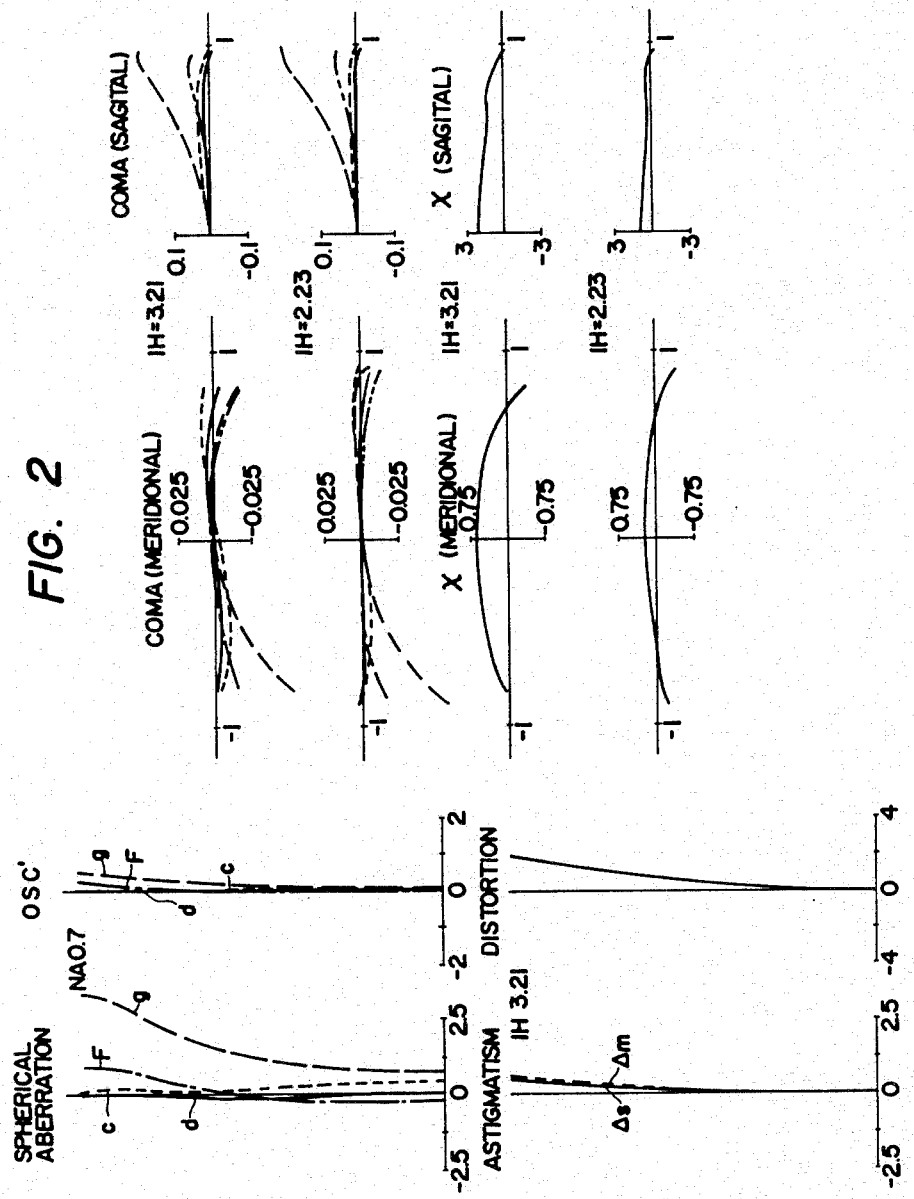
FIG. 2 shows graphs illustrating aberration curves of Embodiment 1 of the microscope according to the present invention.
Figure 3:
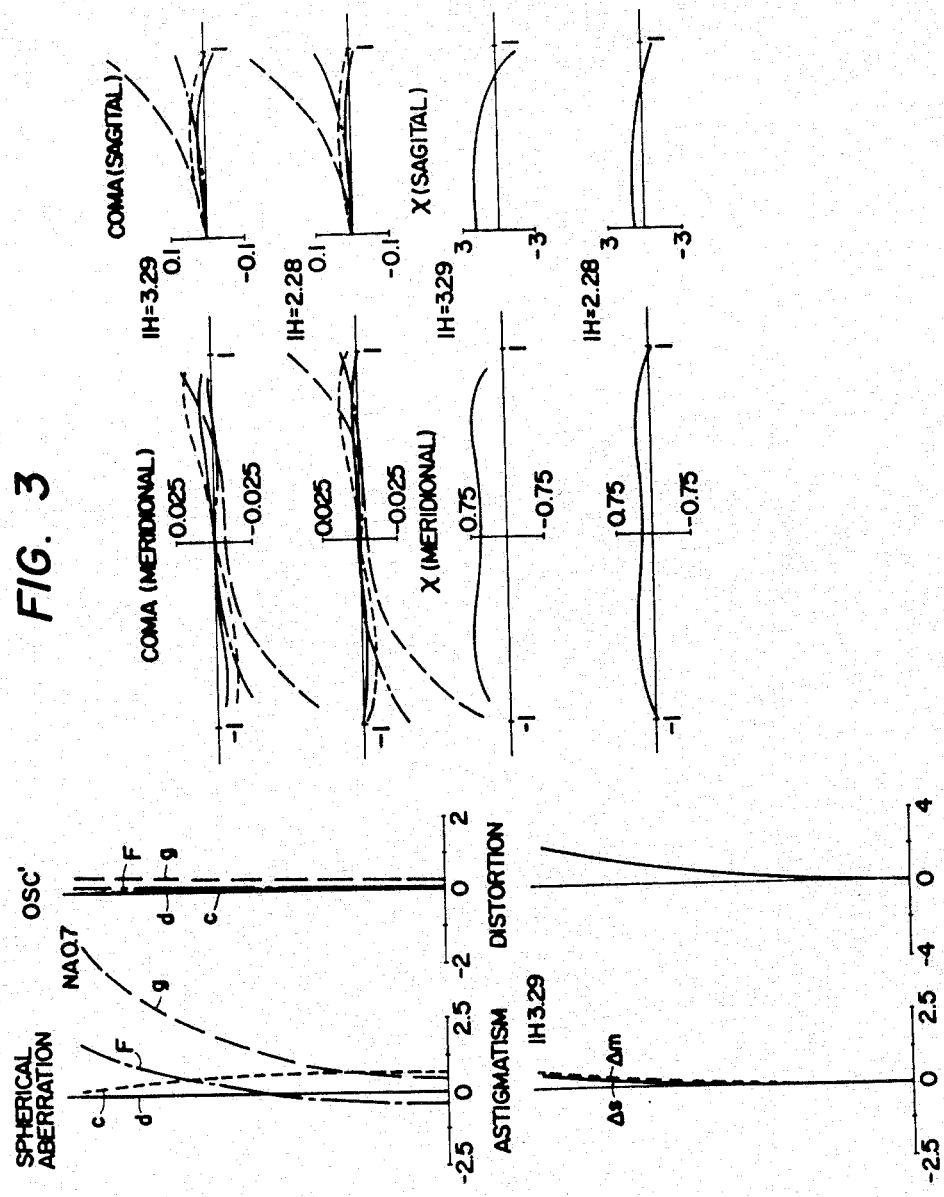
FIG. 3 shows graphs illustrating aberration curves of Embodiment 2.
Figure 4:
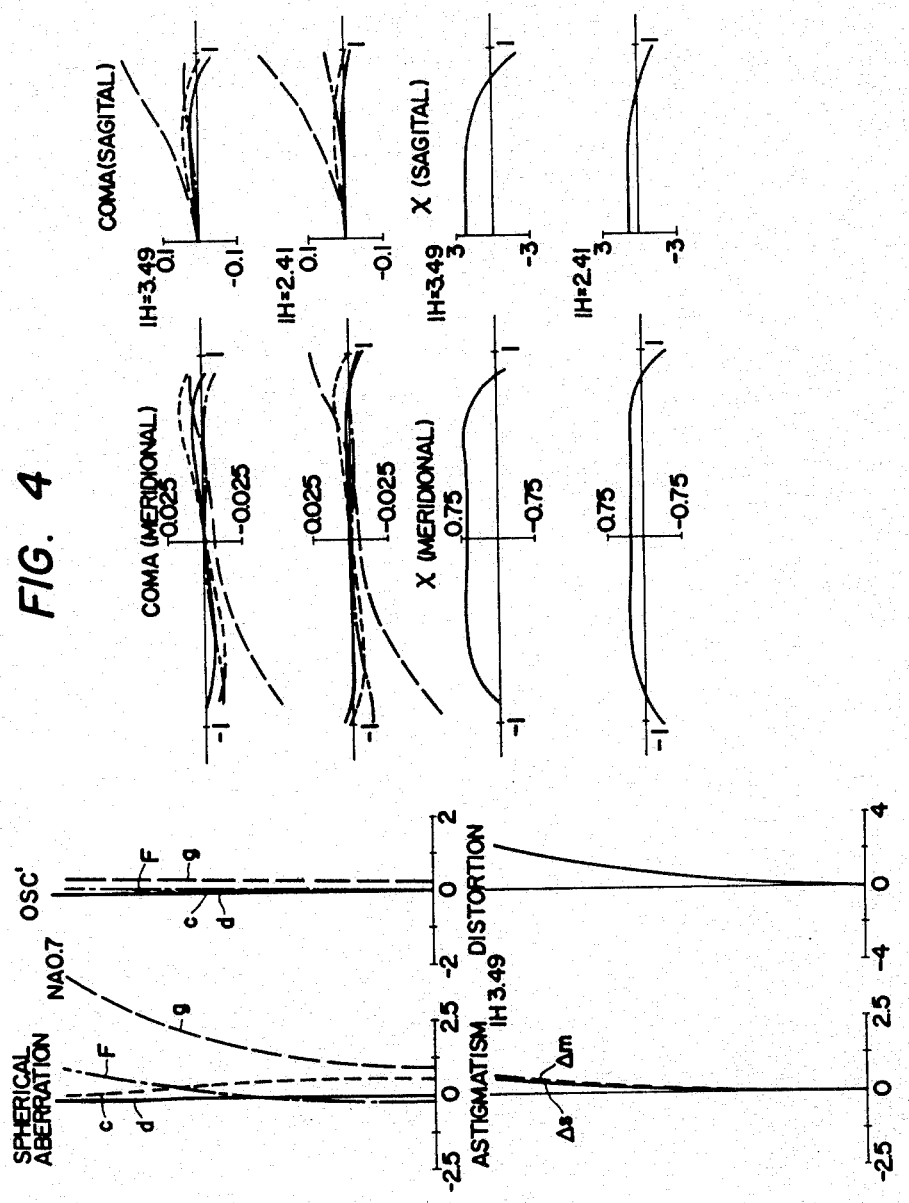
FIG. 4 shows graphs illustrating aberration curves of Embodiment 3.
Figure 5:
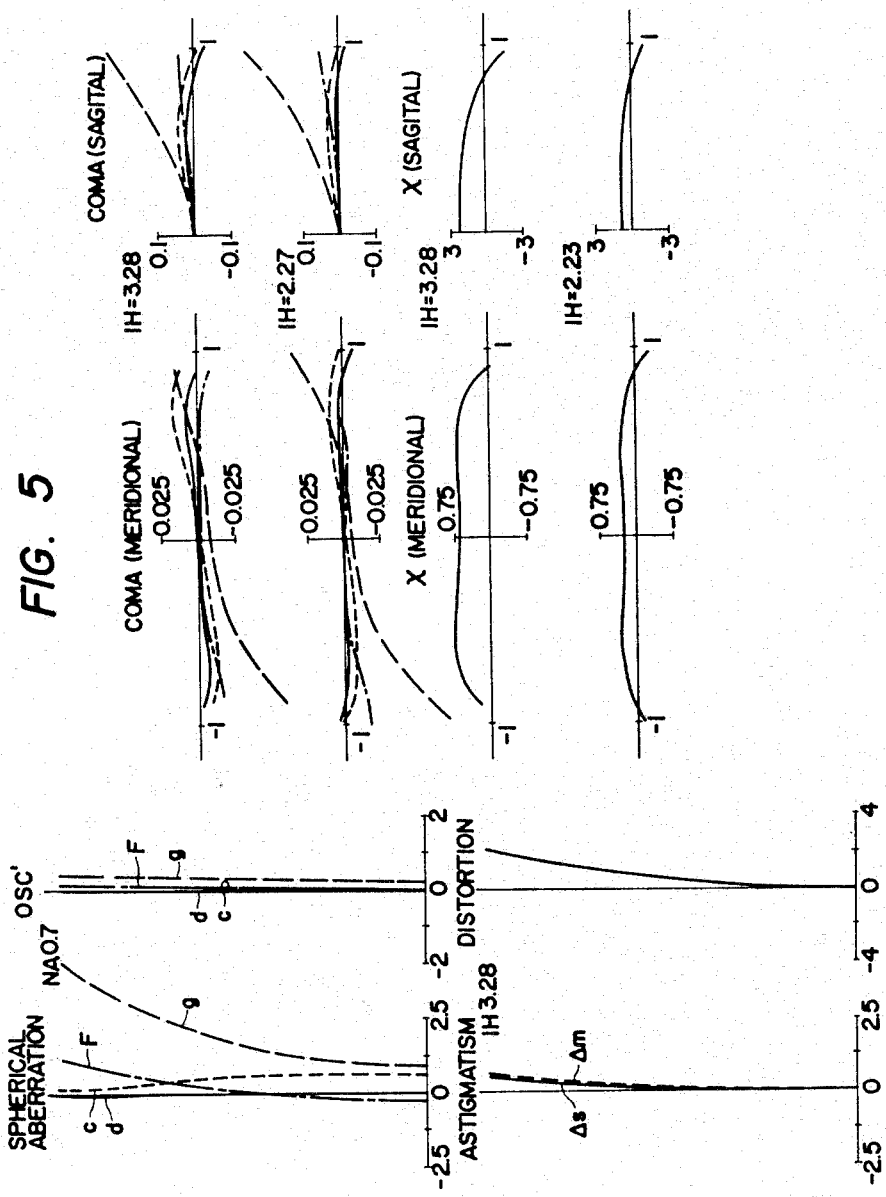
FIG. 5 shows graphs illustrating aberration curves of Embodiment 4.
Figure 6:
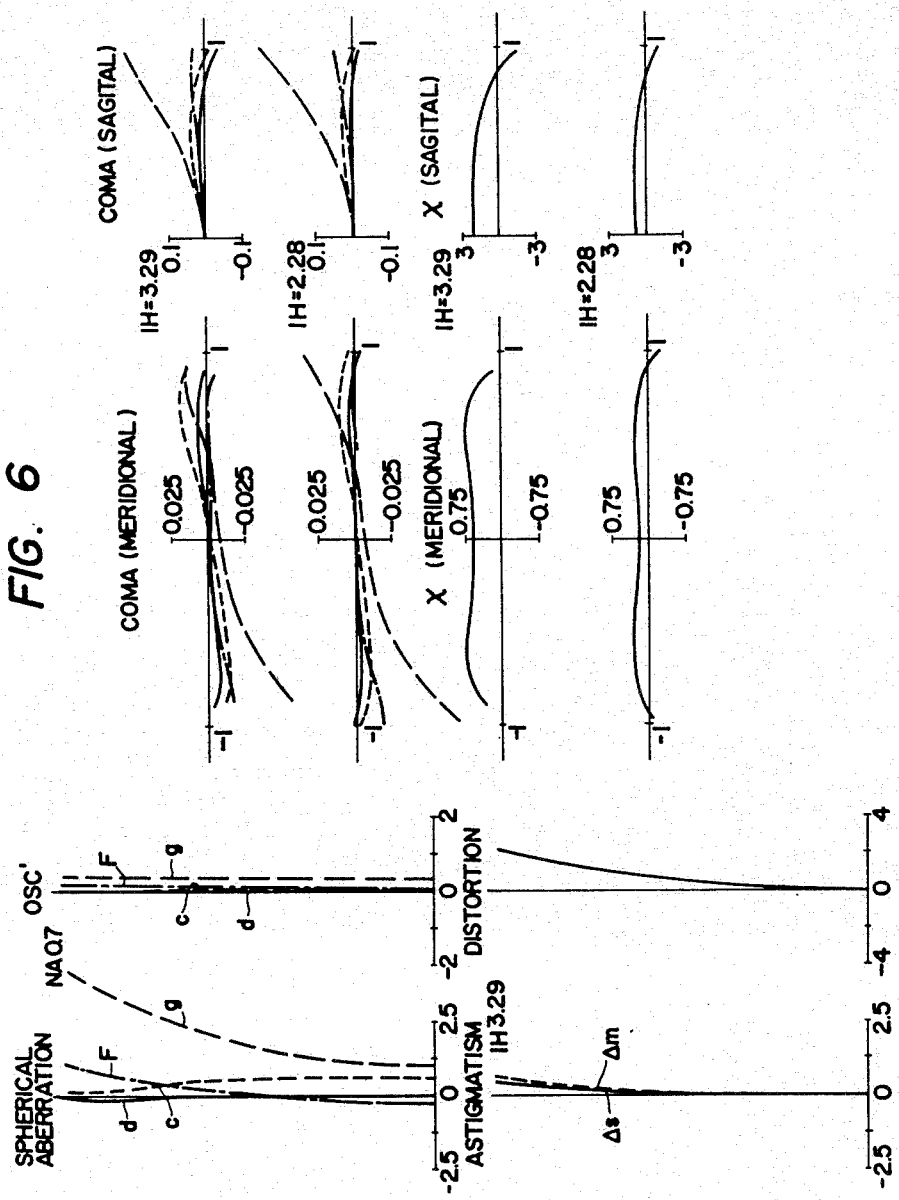
FIG. 6 shows graphs illustrating aberration curves of Embodiment 5.
Figure 7:
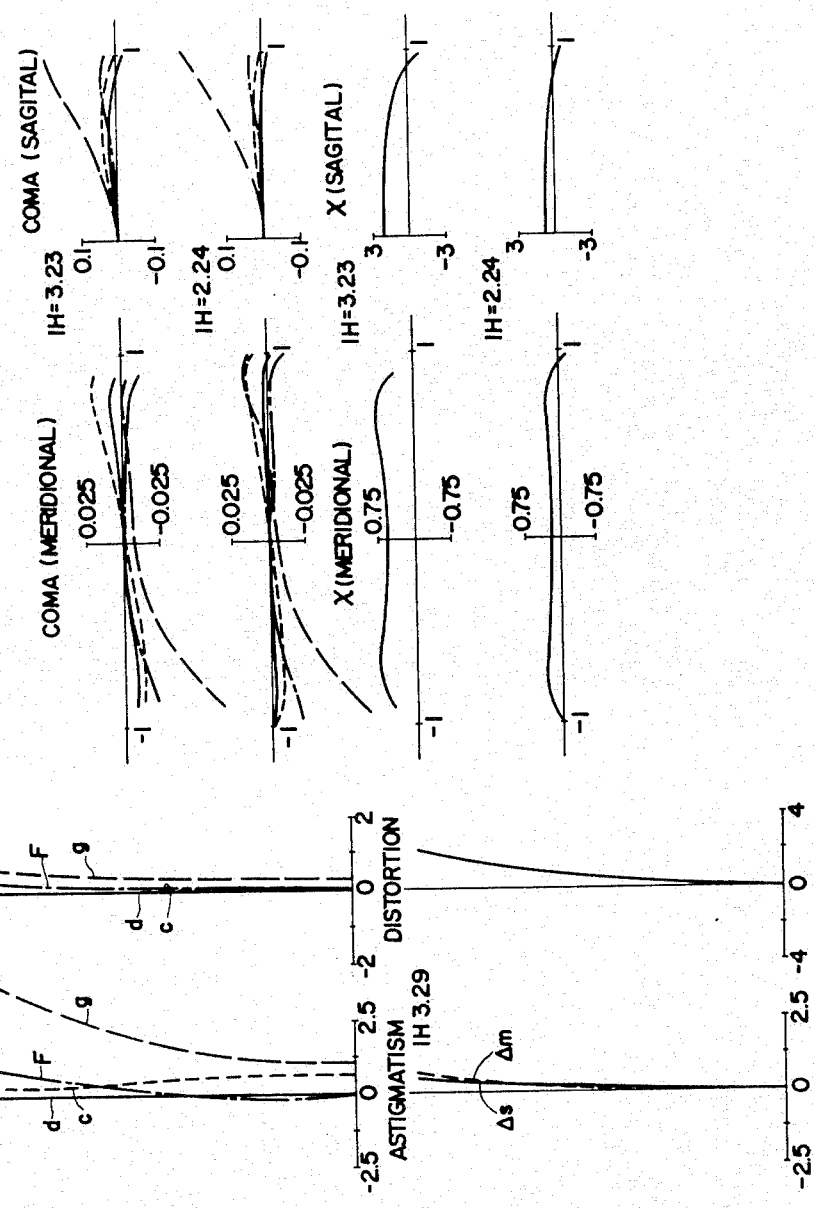
FIG. 7 shows graphs illustrating aberration curves of Embodiment 6.
Figure 8:
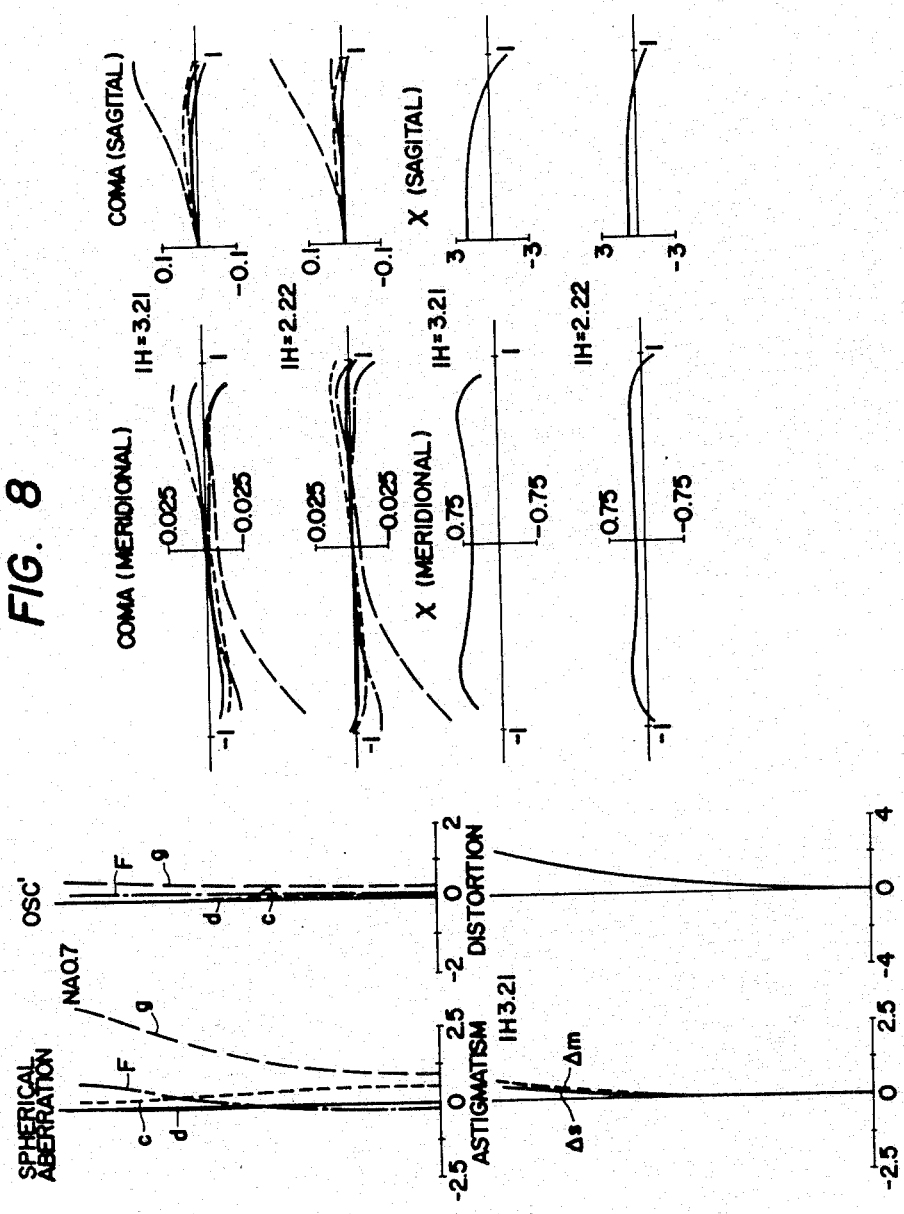
FIG. 8 shows graphs illustrating aberration curves of Embodiment 7.
Figure 9:
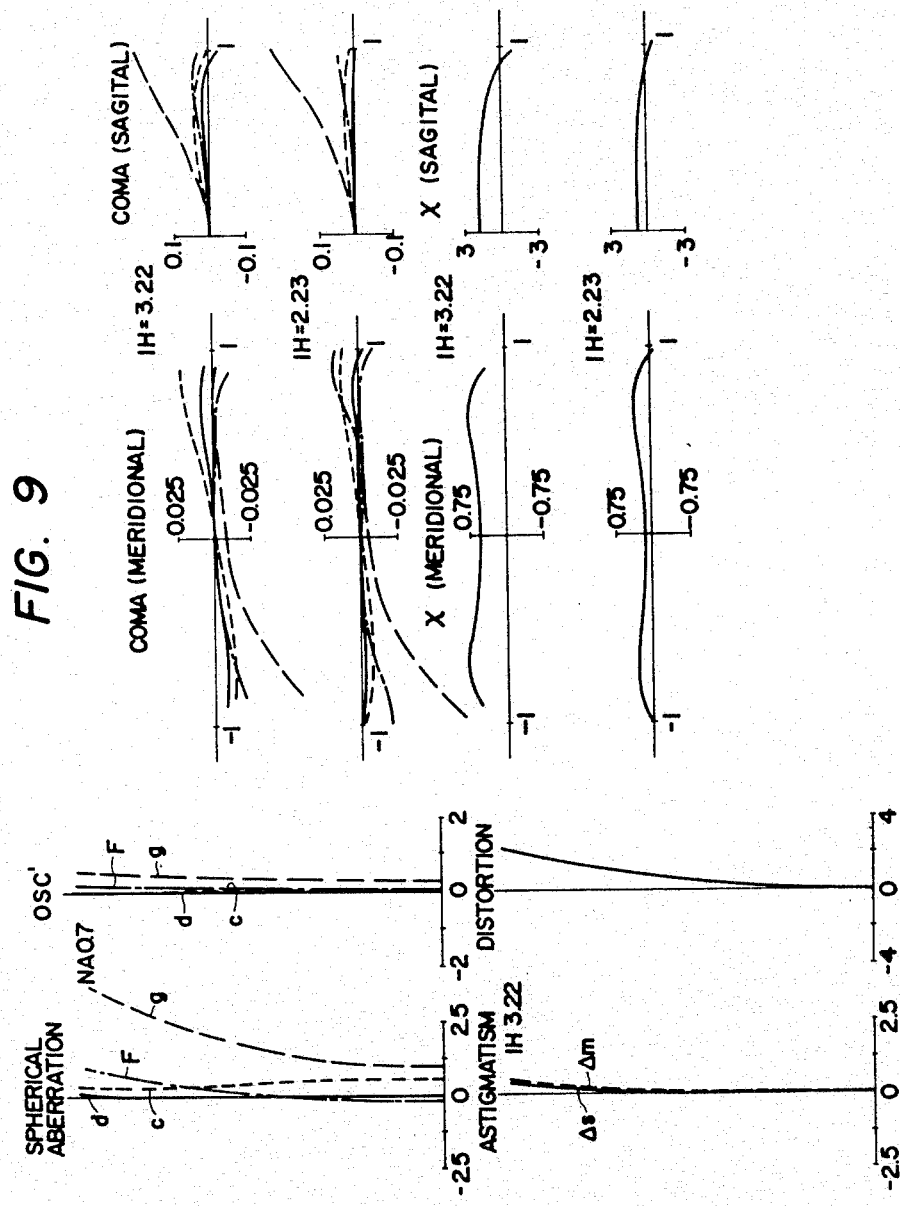
FIG. 9 shows graphs illustrating aberration curves of Embodiment 8.
Figure 10:
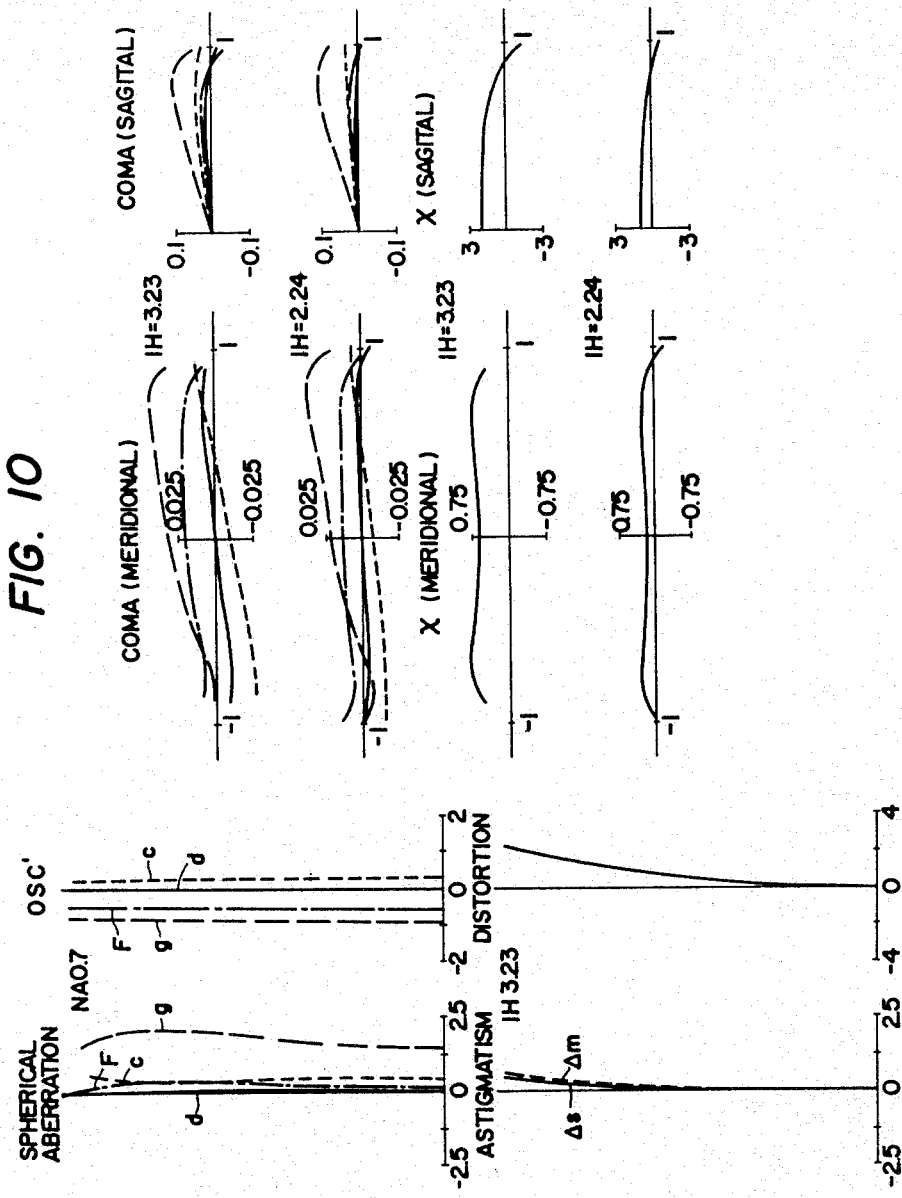
FIG. 10 shows graphs illustrating aberration curves of Embodiment 9.

Preferred embodiments of the microscope objective according to the present invention explained in the above are as shown below.

Embodiment 1

| | | | |
|---|---|---|---|
| $f = 1.0$ | | $N.A. = 0.7$ | $\beta = -40X$ |
| $W.D = 0.1374$ | | Petzval's sum $= -0.090$ | |
| $r_1 = -0.4820$ | | | |
| | $d_1 = 0.8512$ | $n_1 = 1.8044$ | $\nu_1 = 39.6$ |
| $r_2 = -0.8883$ | | | |
| | $d_2 = 0.0252$ | | |
| $r_3 = -8.6970$ | | | |
| | $d_3 = 0.3976$ | $n_2 = 1.4925$ | $\nu_2 = 81.9$ |
| $r_4 = -1.2888$ | | | |
| | $d_4 = 0.0345$ | | |
| $r_5 = 70.2367$ | | | |
| | $d_5 = 0.2101$ | $n_3 = 1.57501$ | $\nu_3 = 41.5$ |
| $r_6 = 1.9721$ | | | |
| | $d_6 = 0.9118$ | $n_4 = 1.4925$ | $\nu_4 = 81.9$ |
| $r_7 = -2.0299$ | | | |
| | $d_7 = 0.0537$ | | |
| $r_8 = -35.0845$ | | | |
| | $d_8 = 0.2182$ | $n_5 = 1.80741$ | $\nu_5 = 31.6$ |
| $r_9 = 1.9211$ | | | |
| | $d_9 = 0.8296$ | $n_6 = 1.4925$ | $\nu_6 = 81.9$ |
| $r_{10} = -2.5774$ | | | |

-continued

| | | | |
|---|---|---|---|
| $r_{11} = 1.8502$ | $d_{10} = 3.3850$ | | |
| | $d_{11} = 0.8023$ | $n_7 = 1.7200$ | $\nu_7 = 42.1$ |
| $r_{12} = -5.3865$ | $d_{12} = 0.1801$ | $n_8 = 1.61484$ | $\nu_8 = 51.2$ |
| $r_{13} = 1.1815$ | | | |

Embodiment 2

$f = 1.0$   N.A. = 0.7   $\beta = -40X$
W.D = 0.1775   Petzval's sum = $-0.070$

| | | | |
|---|---|---|---|
| $r_1 = -0.6174$ | $d_1 = 1.1273$ | $n_1 = 1.8040$ | $\nu_1 = 46.6$ |
| $r_2 = -1.0928$ | $d_2 = 0.0258$ | | |
| $r_3 = -7.9397$ | $d_3 = 0.4025$ | $n_2 = 1.4925$ | $\nu_2 = 81.9$ |
| $r_4 = -1.5078$ | $d_4 = 0.0263$ | | |
| $r_5 = 225.0088$ | $d_5 = 0.2369$ | $n_3 = 1.57501$ | $\nu_3 = 31.3$ |
| $r_6 = 2.1418$ | $d_6 = 0.8817$ | $n_4 = 1.43389$ | $\nu_4 = 95.2$ |
| $r_7 = -2.1959$ | $d_7 = 0.0373$ | | |
| $r_8 = 11.9166$ | $d_8 = 0.2415$ | $n_5 = 1.8074$ | $\nu_5 = 35.4$ |
| $r_9 = 2.4781$ | $d_9 = 0.6823$ | $n_6 = 1.4925$ | $\nu_6 = 81.9$ |
| $r_{10} = -5.4291$ | $d_{10} = 4.2798$ | | |
| $r_{11} = 2.2353$ | $d_{11} = 1.0278$ | $n_7 = 1.72$ | $\nu_7 = 42.7$ |
| $r_{12} = -4.6592$ | $d_{12} = 0.2486$ | $n_8 = 1.61484$ | $\nu_8 = 51.8$ |
| $r_{13} = 1.3126$ | | | |

Embodiment 3

$f = 1.0$   N.A. = 0.7   $\beta = -40X$
W.D = 0.1787   Petzval's sum = $-0.079$

| | | | |
|---|---|---|---|
| $r_1 = -0.6138$ | $d_1 = 1.1255$ | $n_1 = 1.8040$ | $\nu_1 = 46.6$ |
| $r_2 = -1.1090$ | $d_2 = 0.0057$ | | |
| $r_3 = -10.8395$ | $d_3 = 0.3882$ | $n_2 = 1.4925$ | $\nu_2 = 81.9$ |
| $r_4 = -1.5183$ | $d_4 = 0.0015$ | | |
| $r_5 = -16.4591$ | $d_5 = 0.2111$ | $n_3 = 1.57501$ | $\nu_3 = 41.6$ |
| $r_6 = 1.9565$ | $d_6 = 0.8902$ | $n_4 = 1.4925$ | $\nu_4 = 81.9$ |
| $r_7 = -2.3135$ | $d_7 = 0.0386$ | | |
| $r_8 = 18.3411$ | $d_8 = 0.2345$ | $n_5 = 1.80741$ | $\nu_5 = 31.6$ |
| $r_9 = 2.3097$ | $d_9 = 0.7370$ | $n_6 = 1.4925$ | $\nu_6 = 81.9$ |
| $r_{10} = -4.1418$ | $d_{10} = 4.4450$ | | |
| $r_{11} = 2.2152$ | $d_{11} = 1.0591$ | $n_7 = 1.72$ | $\nu_7 = 48.6$ |
| $r_{12} = -4.3117$ | $d_{12} = 0.2558$ | $n_8 = 1.62041$ | $\nu_8 = 60.3$ |
| $r_{13} = 1.2984$ | | | |

Embodiment 4

$f = 1.0$   N.A = 0.7   $\beta0 = -40X$
W.D = 0.1793   Petzval's sum = $-0.080$

| | | | |
|---|---|---|---|
| $r_1 = -0.6123$ | $d_1 = 1.1216$ | $n_1 = 1.8040$ | $\nu_1 = 46.6$ |
| $r_2 = -1.1004$ | $d_2 = 0.0053$ | | |
| $r_3 = -11.9453$ | $d_3 = 0.3884$ | $n_2 = 1.4925$ | $\nu_2 = 81.9$ |
| $r_4 = -1.5303$ | $d_4 = 0.0007$ | | |
| $r_5 = -13.5820$ | $d_5 = 0.2086$ | $n_3 = 1.57501$ | $\nu_3 = 41.5$ |
| $r_6 = 1.9633$ | $d_6 = 0.8866$ | $n_4 = 1.4925$ | $\nu_4 = 81.9$ |
| $r_7 = -2.3008$ | $d_7 = 0.0383$ | | |
| $r_8 = 18.3419$ | $d_8 = 0.2302$ | $n_5 = 1.80741$ | $\nu_5 = 31.6$ |
| $r_9 = 2.3197$ | $d_9 = 0.7330$ | $n_6 = 1.4925$ | $\nu_6 = 81.9$ |
| $r_{10} = -4.0719$ | $d_{10} = 4.4228$ | | |
| $r_{11} = 2.1927$ | $d_{11} = 1.0526$ | $n_7 = 1.72$ | $\nu_7 = 48.6$ |
| $r_{12} = -4.5524$ | $d_{12} = 0.2520$ | $n_8 = 1.62041$ | $\nu_8 = 60.3$ |
| $r_{13} = 1.2908$ | | | |

Embodiment 5

$f = 1.0$   N.A = 0.7   $\beta = -40X$
W.D = 0.1801   Petzval's sum = $-0.079$

| | | | |
|---|---|---|---|
| $r_1 = -0.6121$ | $d_1 = 1.1176$ | $n_1 = 1.8040$ | $\nu_1 = 46.6$ |
| $r_2 = -1.0892$ | $d_2 = 0.0243$ | | |
| $r_3 = -12.5765$ | $d_3 = 0.3783$ | $n_2 = 1.4925$ | $\nu_2 = 81.9$ |
| $r_4 = -1.5447$ | $d_4 = 0.0243$ | | |
| $r_5 = -14.7577$ | $d_5 = 0.1969$ | $n_3 = 1.57501$ | $\nu_3 = 41.5$ |
| $r_6 = 1.9544$ | $d_6 = 0.8805$ | $n_4 = 1.4925$ | $\nu_4 = 81.9$ |
| $r_7 = -2.3255$ | $d_7 = 0.0385$ | | |
| $r_8 = 20.6541$ | $d_8 = 0.2252$ | $n_5 = 1.80741$ | $\nu_5 = 31.6$ |
| $r_9 = 2.3318$ | $d_9 = 0.7320$ | $n_6 = 1.4925$ | $\nu_6 = 81.9$ |
| $r_{10} = -4.0870$ | $d_{10} = 4.4418$ | | |
| $r_{11} = 2.1639$ | $d_{11} = 1.0616$ | $n_7 = 1.72$ | $\nu_7 = 48.6$ |
| $r_{12} = -5.1345$ | $d_{12} = 0.2571$ | $n_8 = 1.62041$ | $\nu_8 = 60.3$ |
| $r_{13} = 1.2791$ | | | |

Embodiment 6

$f = 1.0$   N.A = 0.7   $\beta = -40X$
W.D = 0.1608   Petzval's sum = $-0.078$

| | | | |
|---|---|---|---|
| $r_1 = -0.5416$ | $d_1 = 0.9893$ | $n_1 = 1.8061$ | $\nu_1 = 40.9$ |
| $r_2 = -0.9872$ | $d_2 = 0.0239$ | | |
| $r_3 = -6.7428$ | $d_3 = 0.4179$ | $n_2 = 1.4925$ | $\nu_2 = 81.9$ |
| $r_4 = -1.3574$ | $d_4 = 0.0239$ | | |
| $r_5 = 13.4725$ | $d_5 = 0.3042$ | $n_3 = 1.58406$ | $\nu_3 = 37.0$ |
| $r_6 = 1.8018$ | $d_6 = 0.8602$ | $n_4 = 1.4925$ | $\nu_4 = 81.9$ |
| $r_7 = -2.3788$ | $d_7 = 0.0349$ | | |
| $r_8 = 276.3533$ | $d_8 = 0.2418$ | $n_5 = 1.80741$ | $\nu_5 = 31.6$ |
| $r_9 = 2.1579$ | $d_9 = 0.6867$ | $n_6 = 1.4925$ | $\nu_6 = 81.9$ |

-continued

| | | | |
|---|---|---|---|
| $r_{10} = -3.5266$ | | | |
| | $d_{10} = 4.0201$ | | |
| $r_{11} = 1.9104$ | | | |
| | $d_{11} = 0.7503$ | $n_7 = 1.72$ | $\nu_7 = 42.1$ |
| $r_{12} = -5.2779$ | | | |
| | $d_{12} = 0.1912$ | $n_8 = 1.6223$ | $\nu_8 = 53.2$ |
| $r_{13} = 1.2313$ | | | |

Embodiment 7

| f = 1.0 | | N.A. = 0.7 | $\beta = -40X$ |
|---|---|---|---|
| W.D. = 0.1594 | | Petzval's sum = $-0.074$ | |
| $r_1 = -0.5000$ | | | |
| | $d_1 = 0.8896$ | $n_1 = 1.8061$ | $\nu_1 = 40.9$ |
| $r_2 = -0.9081$ | | | |
| | $d_2 = 0.0237$ | | |
| $r_3 = -7.1807$ | | | |
| | $d_3 = 0.4323$ | $n_2 = 1.4925$ | $\nu_2 = 81.9$ |
| $r_4 = -1.2718$ | | | |
| | $d_4 = 0.0237$ | | |
| $r_5 = 15.0770$ | | | |
| | $d_5 = 0.3704$ | $n_3 = 1.58406$ | $\nu_3 = 37.0$ |
| $r_6 = 1.6894$ | | | |
| | $d_6 = 0.8565$ | $n_4 = 1.4925$ | $\nu_4 = 81.9$ |
| $r_7 = -2.3253$ | | | |
| | $d_7 = 0.0346$ | | |
| $r_8 = 194.4296$ | | | |
| | $d_8 = 0.2061$ | $n_5 = 1.80741$ | $\nu_5 = 31.6$ |
| $r_9 = 2.1650$ | | | |
| | $d_9 = 0.6322$ | $n_6 = 1.4925$ | $\nu_6 = 81.9$ |
| $r_{10} = -3.3632$ | | | |
| | $d_{10} = 3.9253$ | | |
| $r_{11} = 1.8164$ | | | |
| | $d_{11} = 0.6746$ | $n_7 = 1.72$ | $\nu_7 = 42.1$ |
| $r_{12} = -4.4908$ | | | |
| | $d_{12} = 0.1201$ | $n_8 = 1.6223$ | $\nu_8 = 52.9$ |
| $r_{13} = 1.2045$ | | | |

Embodiment 8

| f = 1.0 | | N.A. = 0.7 | $\beta = -40X$ |
|---|---|---|---|
| W.D. = 0.1604 | | Petzval's sum = $-0.077$ | |
| $r_1 = -0.5413$ | | | |
| | $d_1 = 1.0112$ | $n_1 = 1.8061$ | $\nu_1 = 40.9$ |
| $r_2 = -0.9964$ | | | |
| | $d_2 = 0.0238$ | | |
| $r_3 = -7.8380$ | | | |
| | $d_3 = 0.3722$ | $n_2 = 1.4925$ | $\nu_2 = 81.9$ |
| $r_4 = -1.3700$ | | | |
| | $d_4 = 0.0238$ | | |
| $r_5 = 11.8263$ | | | |
| | $d_5 = 0.2750$ | $n_3 = 1.58406$ | $\nu_3 = 37.0$ |
| $r_6 = 1.7424$ | | | |
| | $d_6 = 0.9142$ | $n_4 = 1.4925$ | $\nu_4 = 81.9$ |
| $r_7 = -2.4077$ | | | |
| | $d_7 = 0.0348$ | | |
| $r_8 = \infty$ | | | |
| | $d_8 = 0.2240$ | $n_5 = 1.80741$ | $\nu_5 = 31.6$ |
| $r_9 = 2.1129$ | | | |
| | $d_9 = 0.7117$ | $n_6 = 1.4925$ | $\nu_6 = 81.9$ |
| $r_{10} = -3.5089$ | | | |
| | $d_{10} = 3.9211$ | | |
| $r_{11} = 1.8949$ | | | |
| | $d_{11} = 0.6848$ | $n_7 = 1.72$ | $\nu_7 = 42.1$ |
| $r_{12} = -5.0874$ | | | |
| | $d_{12} = 0.2144$ | $n_8 = 1.6223$ | $\nu_8 = 53.2$ |
| $r_{13} = 1.2292$ | | | |

Embodiment 9

| f = 1.0 | N.A. = 0.7 | $\beta = -40X$ |
|---|---|---|
| W.D. = 0.1608 | Petzval's sum = $-0.078$ | |
| $r_1 = -0.5420$ | | |

-continued

| | | | |
|---|---|---|---|
| | $d_1 = 0.9919$ | $n_1 = 1.8061$ | $\nu_1 = 25.8$ |
| $r_2 = -0.9896$ | | | |
| | $d_2 = 0.0239$ | | |
| $r_3 = -6.6031$ | | | |
| | $d_3 = 0.4225$ | $n_2 = 1.4925$ | $\nu_2 = 81.9$ |
| $r_4 = -1.3593$ | | | |
| | $d_4 = 0.0024$ | | |
| $r_5 = 12.4704$ | | | |
| | $d_5 = 0.3109$ | $n_3 = 1.58406$ | $\nu_3 = 39.6$ |
| $r_6 = 1.7989$ | | | |
| | $d_6 = 0.8657$ | $n_4 = 1.4925$ | $\nu_4 = 81.9$ |
| $r_7 = -2.3880$ | | | |
| | $d_7 = 0.0349$ | | |
| $r_8 = 288.1485$ | | | |
| | $d_8 = 0.2459$ | $n_5 = 1.80741$ | $\nu_5 = 27.7$ |
| $r_9 = 2.1463$ | | | |
| | $d_9 = 0.6913$ | $n_6 = 1.4925$ | $\nu_6 = 81.9$ |
| $r_{10} = -3.5288$ | | | |
| | $d_{10} = 4.0225$ | | |
| $r_{11} = 1.9156$ | | | |
| | $d_{11} = 0.7460$ | $n_7 = 1.72$ | $\nu_7 = 43.0$ |
| $r_{12} = -5.1341$ | | | |
| | $d_{12} = 0.1869$ | $n_8 = 1.6223$ | $\nu_8 = 50.0$ |
| $r_{13} = 1.2355$ | | | |

In the above embodiments, reference symbol f represents the focal length of the lens system as a whole, reference symbols $r_1$ through $r_{13}$ respectively represent radii of curvature of respective lens surfaces, reference symbols $d_1$ through $d_{12}$ respectively represent thicknesses of respective lenses and airspaces between respective lenses, reference symbols $n_1$ through $n_8$ respectively represent refractive indices of respective lenses, and reference symbols $\nu_1$ through $\nu_8$ respectively represent Abbe's numbers of respective lenses.

I claim:

1. A microscope objective comprising a first, second, third, fourth and fifth lens components, said first lens component being a thick negative meniscus lens arranged concave toward the object side, said second lens component being a positive meniscus lens arranged concave toward the object side, said third lens component being a positive cemented doublet, said fourth lens component being a positive cemented doublet, said fifth lens component being negative cemented meniscus doublet arranged concave toward the image side, said microscope objective satisfying the following conditions:

$$1.75 \leq \frac{n_1 - 1}{r_1} / \frac{n_1 - 1}{r_2} \leq 1.95 \quad (1)$$

$$1.45 \leq n_1 d_1 / f \leq 2.15 \quad (2)$$

$$1.25 \leq \frac{n_8 - 1}{r_{13}} / \frac{n_7 - 1}{r_{11}} \leq 1.55 \quad (3)$$

$$1.30 \leq \frac{n_7 d_{11} + n_8 d_{12}}{f} \leq 2.35 \quad (4)$$

$$-0.05 \leq \frac{n_3 - 1}{r_5} f \leq 0.050 \quad (5)$$

$$3.0 \leq \frac{d_{10}}{f} \leq 5.0 \quad (6)$$

$$90 \leq [(\nu_4 - \nu_3) + (\nu_6 - \nu_5)] \leq 120 \quad (7)$$

wherein reference symbol f represents the focal length of the lens system as a whole, reference symbols $r_1$ and $r_2$ respectively represent radii of curvature of respective surfaces of the first lens component, reference symbol $r_5$ represents the radius of curvature of the surface on the object side of the third lens component, reference symbols $r_{11}$ and $r_{13}$ respectively represent radii of curvature of the surface on the object side and surface on the image side of the fifth lens component, reference symbol $d_1$ represents the thickness of the first lens component, reference symbols $d_{11}$ and $d_{12}$ respectively represent thicknesses of respective lenses constituting the fifth lens component, reference symbol $d_{10}$ represents the airspace between the fourth and fifth lens components, reference symbol $n_1$ represents the refractive index of the first lens component, reference symbol $n_3$ represents the refractive index of the lens on the object side in the third lens component, reference symbols $n_7$ and $n_8$ respectively represent refractive indices of respective lenses constituting the fifth lens component, reference symbols $\nu_3$ and $\nu_4$ respectively represent Abbe's numbers of respective lenses constituting the third lens component, and reference symbols $\nu_5$ and $\nu_6$ respectively represent Abbe's numbers of respective lenses constituting the fourth lens component.

2. A microscope objective according to claim 1 further satisfying the following conditions:

$$-0.45 \leq \frac{n_2 - 1}{r_4} f \leq -0.25 \quad (8)$$

$$-0.03 \leq \frac{n_5 - 1}{r_8} f \leq 0.075 \quad (9)$$

wherein reference symbol f represents the focal length of the lens system as a whole, reference symbol $r_4$ represents the radius of curvature of the surface on the image side of the second lens component, reference symbol $r_8$ represents the radius of curvature of the surface on the object side of the fourth lens component, reference symbol $n_2$ represents the refractive index of the second lens component, and reference symbol $n_5$ represents the refractive index of the lens on the object side in the fourth lens component.

3. A microscope objective according to claim 1, in which said microscope objective has the following numerical data:

| f = 1.0 W.D = 0.1374 | | N.A. = 0.7   $\beta$ = −40X Petzval's sum = −0.090 | |
|---|---|---|---|
| $r_1 = -0.4820$ | | | |
| | $d_1 = 0.8512$ | $n_1 = 1.8044$ | $\nu_1 = 39.6$ |
| $r_2 = -0.8883$ | | | |
| | $d_2 = 0.0252$ | | |
| $r_3 = -8.6970$ | | | |
| | $d_3 = 0.3976$ | $n_2 = 1.4925$ | $\nu_2 = 81.9$ |
| $r_4 = -1.2888$ | | | |
| | $d_4 = 0.0345$ | | |
| $r_5 = 70.2367$ | | | |
| | $d_5 = 0.2101$ | $n_3 = 1.57501$ | $\nu_3 = 41.5$ |
| $r_6 = 1.9721$ | | | |
| | $d_6 = 0.9118$ | $n_4 = 1.4925$ | $\nu_4 = 81.9$ |
| $r_7 = -2.0299$ | | | |
| | $d_7 = 0.0537$ | | |
| $r_8 = -35.0845$ | | | |
| | $d_8 = 0.2182$ | $n_5 = 1.80741$ | $\nu_5 = 31.6$ |
| $r_9 = 1.9211$ | | | |
| | $d_9 = 0.8296$ | $n_6 = 1.4925$ | $\nu_6 = 81.9$ |
| $r_{10} = -2.5774$ | | | |
| | $d_{10} = 3.3850$ | | |
| $r_{11} = 1.8502$ | | | |
| | $d_{11} = 0.8023$ | $n_7 = 1.7200$ | $\nu_7 = 42.1$ |
| $r_{12} = -5.3865$ | | | |
| | $d_{12} = 0.1801$ | $n_8 = 1.61484$ | $\nu_8 = 51.2$ |
| $r_{13} = 1.1815$ | | | | wherein reference symbol f represents the focal length of the lens system as a whole, reference symbols $r_1$ through $r_{13}$ respectively represent radii of curvature of respective lens surfaces, reference symbol $d_1$ through $d_{12}$ respectively represent thicknesses of respective lenses and airspaces between respective lenses, reference symbols $n_1$ through $n_8$ respectively represent refractive indices of respective lenses, and reference symbols $\nu_1$ through $\nu_8$ respectively represent Abbe's numbers of respective lenses.

4. A microscope objective according to claim 1, in which said microscope objective has the following numerical data:

| f = 1.0 W.D = 0.1775 | | N.A. = 0.7   $\beta$ = −40X Petzval's sum = −0.070 | |
|---|---|---|---|
| $r_1 = -0.6174$ | | | |
| | $d_1 = 1.1273$ | $n_1 = 1.8040$ | $\nu_1 = 46.6$ |
| $r_2 = -1.0928$ | | | |
| | $d_2 = 0.0258$ | | |
| $r_3 = -7.9397$ | | | |
| | $d_3 = 0.4025$ | $n_2 = 1.4925$ | $\nu_2 = 81.9$ |
| $r_4 = -1.5078$ | | | |
| | $d_4 = 0.0263$ | | |
| $r_5 = 225.0088$ | | | |
| | $d_5 = 0.2369$ | $n_3 = 1.57501$ | $\nu_3 = 31.3$ |
| $r_6 = 2.1418$ | | | |
| | $d_6 = 0.8817$ | $n_4 = 1.43389$ | $\nu_4 = 95.2$ |
| $r_7 = -2.1959$ | | | |
| | $d_7 = 0.0373$ | | |
| $r_8 = 11.9166$ | | | |
| | $d_8 = 0.2415$ | $n_5 = 1.8074$ | $\nu_5 = 35.4$ |
| $r_9 = 2.4781$ | | | |
| | $d_9 = 0.6823$ | $n_6 = 1.4925$ | $\nu_6 = 81.9$ |
| $r_{10} = -5.4291$ | | | |
| | $d_{10} = 4.2798$ | | |
| $r_{11} = 2.2353$ | | | |
| | $d_{11} = 1.0278$ | $n_7 = 1.72$ | $\nu_7 = 42.7$ |
| $r_{12} = -4.6592$ | | | |
| | $d_{12} = 0.2486$ | $n_8 = 1.61484$ | $\nu_8 = 51.8$ |
| $r_{13} = 1.3126$ | | | | wherein reference symbol f represents the focal length of the lens system as a whole, reference symbols $r_1$ through $r_{13}$ respectively represent radii of curvature of respective lens surfaces, reference symbol $d_1$ through $d_{12}$ respectively represent thicknesses of respective lenses and airspaces between respective lenses, reference symbols $n_1$ through $n_8$ respectively represent refractive indices of respective lenses, and reference symbols $\nu_1$ through $\nu_8$ respectively represent Abbe's numbers of respective lenses.

5. A microscope objective according to claim 1, in which said microscope objective has the following numerical data:

| f = 1.0 W.D = 0.1787 | | N.A. = 0.7   $\beta$ = −40X Petzval's sum = −0.079 | |
|---|---|---|---|
| $r_1 = -0.6138$ | | | |
| | $d_1 = 1.1255$ | $n_1 = 1.8040$ | $\nu_1 = 46.6$ |
| $r_2 = -1.1090$ | | | |
| | $d_2 = 0.0057$ | | |
| $r_3 = -10.8395$ | | | |
| | $d_3 = 0.3882$ | $n_2 = 1.4925$ | $\nu_2 = 81.9$ |
| $r_4 = -1.5183$ | | | |
| | $d_4 = 0.0015$ | | |
| $r_5 = -16.4591$ | | | |
| | $d_5 = 0.2111$ | $n_3 = 1.57501$ | $\nu_3 = 41.6$ |
| $r_6 = 1.9565$ | | | |
| | $d_6 = 0.8902$ | $n_4 = 1.4925$ | $\nu_4 = 81.9$ |
| $r_7 = -2.3135$ | | | |
| | $d_7 = 0.0386$ | | |
| $r_8 = 18.3411$ | | | |
| | $d_8 = 0.2345$ | $n_5 = 1.80741$ | $\nu_5 = 31.6$ |
| $r_9 = 2.3097$ | | | |
| | $d_9 = 0.7370$ | $n_6 = 1.4925$ | $\nu_6 = 81.9$ |

-continued

| | | | |
|---|---|---|---|
| $r_{10} = -4.1418$ | | | |
| | $d_{10} = 4.4450$ | | |
| $r_{11} = 2.2152$ | | | |
| | $d_{11} = 1.0591$ | $n_7 = 1.72$ | $v_7 = 48.6$ |
| $r_{12} = -4.3117$ | | | |
| | $d_{12} = 0.2558$ | $n_8 = 1.62041$ | $v_8 = 60.3$ |
| $r_{13} = 1.2984$ | | | | wherein reference symbol f represents the focal length of the lens system as a whole, reference symbols $r_1$ through $r_{13}$ respectively represent radii of curvature of respective lens surfaces, reference symbol $d_1$ through $d_{12}$ respectively represent thicknesses of respective lenses and airspaces between respective lenses, reference symbols $n_1$ through $n_8$ respectively represent refractive indices of respective lenses, and reference symbols $v_1$ through $v_8$ respectively represent Abb's numbers of respective lenses.

6. A microscope objective according to claim 1, in which said microscope objective has the following numerical data:

| f = 1.0 | | N.A = 0.7 | $\beta0 = -40X$ |
|---|---|---|---|
| W.D = 0.1793 | | Petzval's sum = $-0.080$ | |
| $r_1 = -0.6123$ | | | |
| | $d_1 = 1.1216$ | $n_1 = 1.8040$ | $v_1 = 46.6$ |
| $r_2 = -1.1004$ | | | |
| | $d_2 = 0.0053$ | | |
| $r_3 = -11.9453$ | | | |
| | $d_3 = 0.3884$ | $n_2 = 1.4925$ | $v_2 = 81.9$ |
| $r_4 = -1.5303$ | | | |
| | $d_4 = 0.0007$ | | |
| $r_5 = -13.5820$ | | | |
| | $d_5 = 0.2086$ | $n_3 = 1.57501$ | $v_3 = 41.5$ |
| $r_6 = 1.9633$ | | | |
| | $d_6 = 0.8866$ | $n_4 = 1.4925$ | $v_4 = 81.9$ |
| $r_7 = -2.3008$ | | | |
| | $d_7 = 0.0383$ | | |
| $r_8 = 18.3419$ | | | |
| | $d_8 = 0.2302$ | $n_5 = 1.80741$ | $v_5 = 31.6$ |
| $r_9 = 2.3197$ | | | |
| | $d_9 = 0.7330$ | $n_6 = 1.4925$ | $v_6 = 81.9$ |
| $r_{10} = -4.0719$ | | | |
| | $d_{10} = 4.4228$ | | |
| $r_{11} = 2.1927$ | | | |
| | $d_{11} = 1.0526$ | $n_7 = 1.72$ | $v_7 = 48.6$ |
| $r_{12} = -4.5524$ | | | |
| | $d_{12} = 0.2520$ | $n_8 = 1.62041$ | $v_8 = 60.3$ |
| $r_{13} = 1.2908$ | | | | wherein reference symbol f represents the focal length of the lens system as a whole, reference symbols $r_1$ through $r_{13}$ respectively represent radii of curvature of respective lens surfaces, reference symbol $d_1$ through $d_{12}$ respectively represent thicknesses of respective lenses and airspaces between respective lenses, reference symbols $n_1$ through $n_8$ respectively represent refractive indices of respective lenses, and reference symbols $v_1$ through $v_8$ respectively represent Abbe's numbers of respective lenses.

7. A microscope objective according to claim 1, in which said microscope objective has the following numerical data:

| f = 1.0 | | N.A = 0.7 | $\beta = -40X$ |
|---|---|---|---|
| W.D = 0.1801 | | Petzval's sum = $-0.079$ | |
| $r_1 = -0.6121$ | | | |
| | $d_1 = 1.1176$ | $n_1 = 1.8040$ | $v_1 = 46.6$ |
| $r_2 = -1.0892$ | | | |
| | $d_2 = 0.0243$ | | |
| $r_3 = -12.5765$ | | | |
| | $d_3 = 0.3783$ | $n_2 = 1.4925$ | $v_2 = 81.9$ |
| $r_4 = -1.5447$ | | | |
| | $d_4 = 0.0243$ | | |
| $r_5 = -14.7577$ | | | |
| | $d_5 = 0.1969$ | $n_3 = 1.57501$ | $v_3 = 41.5$ |
| $r_6 = 1.9544$ | | | |
| | $d_6 = 0.8805$ | $n_4 = 1.4925$ | $v_4 = 81.9$ |
| $r_7 = -2.3255$ | | | |
| | $d_7 = 0.0385$ | | |
| $r_8 = 20.6541$ | | | |
| | $d_8 = 0.2252$ | $n_5 = 1.80741$ | $v_5 = 31.6$ |
| $r_9 = 2.3318$ | | | |
| | $d_9 = 0.7320$ | $n_6 = 1.4925$ | $v_6 = 81.9$ |
| $r_{10} = -4.0870$ | | | |
| | $d_{10} = 4.4418$ | | |
| $r_{11} = 2.1639$ | | | |
| | $d_{11} = 1.0616$ | $n_7 = 1.72$ | $v_7 = 48.6$ |
| $r_{12} = -5.1345$ | | | |
| | $d_{12} = 0.2571$ | $n_8 = 1.62041$ | $v_8 = 60.3$ |
| $r_{13} = 1.2791$ | | | | wherein reference symbol f represents the focal length of the lens system as a whole, reference symbols $r_1$ through $r_{13}$ respectively represent radii of curvature of respective lens surfaces, reference symbol $d_1$ through $d_{12}$ respectively represent thicknesses of respective lenses and airspaces between respective lenses, reference symbols $n_1$ through $n_8$ respectively represent refractive indices of respective lenses, and reference symbols $v_1$ through $v_8$ respectively represent Abbe's numbers of respective lenses.

8. A microscope objective according to claim 1, in which said microscope objective has the following numerical data:

| f = 1.0 | | N.A = 0.7 | $\beta = -40X$ |
|---|---|---|---|
| W.D = 0.1608 | | Petzval's sum = $-0.078$ | |
| $r_1 = -0.5416$ | | | |
| | $d_1 = 0.9893$ | $n_1 = 1.8061$ | $v_1 = 40.9$ |
| $r_2 = -0.9872$ | | | |
| | $d_2 = 0.0239$ | | |
| $r_3 = -6.7428$ | | | |
| | $d_3 = 0.4179$ | $n_2 = 1.4925$ | $v_2 = 81.9$ |
| $r_4 = -1.3574$ | | | |
| | $d_4 = 0.0239$ | | |
| $r_5 = 13.4725$ | | | |
| | $d_5 = 0.3042$ | $n_3 = 1.58406$ | $v_3 = 37.0$ |
| $r_6 = 1.8018$ | | | |
| | $d_6 = 0.8602$ | $n_4 = 1.4925$ | $v_4 = 81.9$ |
| $r_7 = -2.3788$ | | | |
| | $d_7 = 0.0349$ | | |
| $r_8 = 276.3533$ | | | |
| | $d_8 = 0.2418$ | $n_5 = 1.80741$ | $v_5 = 31.6$ |
| $r_9 = 2.1579$ | | | |
| | $d_9 = 0.6867$ | $n_6 = 1.4925$ | $v_6 = 81.9$ |
| $r_{10} = -3.5266$ | | | |
| | $d_{10} = 4.0201$ | | |
| $r_{11} = 1.9104$ | | | |
| | $d_{11} = 0.7503$ | $n_7 = 1.72$ | $v_7 = 42.1$ |
| $r_{12} = -5.2779$ | | | |
| | $d_{12} = 0.1912$ | $n_8 = 1.6223$ | $v_8 = 53.2$ |
| $r_{13} = 1.2313$ | | | | wherein reference symbol f represents the focal length of the lens system as a whole, reference symbols $r_1$ through $r_{13}$ respectively represent radii of curvature of respective lens surfaces, reference symbol $d_1$ through $d_{12}$ respectively represent thicknesses of respective lenses and airspaces between respective lenses, reference symbols $n_1$ through $n_8$ respectively represent refractive indices of respective lenses, and reference symbols $v_1$ through $v_8$ respectively represent Abbe's numbers of respective lenses.

9. A microscope objective according to claim 1, in which said microscope objective has the following numerical data:

| | f = 1.0 W.D. = 0.1594 | | N.A. = 0.7 Petzval's sum = −0.074 | β = −40X |
|---|---|---|---|---|
| $r_1 = -0.5000$ | | | | |
| | $d_1 = 0.8896$ | $n_1 = 1.8061$ | $\nu_1 = 40.9$ | |
| $r_2 = -0.9081$ | | | | |
| | $d_2 = 0.0237$ | | | |
| $r_3 = -7.1807$ | | | | |
| | $d_3 = 0.4323$ | $n_2 = 1.4925$ | $\nu_2 = 81.9$ | |
| $r_4 = -1.2718$ | | | | |
| | $d_4 = 0.0237$ | | | |
| $r_5 = 15.0770$ | | | | |
| | $d_5 = 0.3704$ | $n_3 = 1.58406$ | $\nu_3 = 37.0$ | |
| $r_6 = 1.6894$ | | | | |
| | $d_6 = 0.8565$ | $n_4 = 1.4925$ | $\nu_4 = 81.9$ | |
| $r_7 = -2.3253$ | | | | |
| | $d_7 = 0.0346$ | | | |
| $r_8 = 194.4296$ | | | | |
| | $d_8 = 0.2061$ | $n_5 = 1.80741$ | $\nu_5 = 31.6$ | |
| $r_9 = 2.1650$ | | | | |
| | $d_9 = 0.6322$ | $n_6 = 1.4925$ | $\nu_6 = 81.9$ | |
| $r_{10} = -3.3632$ | | | | |
| | $d_{10} = 3.9253$ | | | |
| $r_{11} = 1.8164$ | | | | |
| | $d_{11} = 0.6746$ | $n_7 = 1.72$ | $\nu_7 = 42.1$ | |
| $r_{12} = -4.4908$ | | | | |
| | $d_{12} = 0.1201$ | $n_8 = 1.6223$ | $\nu_8 = 52.9$ | |
| $r_{13} = 1.2045$ | | | | | wherein reference symbol f represents the focal length of the lens system as a whole, reference symbols $r_1$ through $r_{13}$ respectively represent radii of curvature of respective lens surfaces, reference symbol $d_1$ through $d_{12}$ respectively respresent thicknesses of respective lenses and airspaces between respective lenses, reference symbols $n_1$ through $n_8$ respectively represent refractive indices of respective lenses, and reference symbols $\nu_1$ through $\nu_8$ respectively represent Abbe's numbers of respective lenses.

10. A microscope objective according to claim 1, in which said microscope objective has the following numerical data:

| | f = 1.0 W.D. = 0.1604 | | N.A. = 0.7 Petzval's sum = −0.077 | β = −40X |
|---|---|---|---|---|
| $r_1 = -0.5413$ | | | | |
| | $d_1 = 1.0112$ | $n_1 = 1.8061$ | $\nu_1 = 40.9$ | |
| $r_2 = -0.9964$ | | | | |
| | $d_2 = 0.0238$ | | | |
| $r_3 = -7.8380$ | | | | |
| | $d_3 = 0.3722$ | $n_2 = 1.4925$ | $\nu_2 = 81.9$ | |
| $r_4 = -1.3700$ | | | | |
| | $d_4 = 0.0238$ | | | |
| $r_5 = 11.8263$ | | | | |
| | $d_5 = 0.2750$ | $n_3 = 1.58406$ | $\nu_3 = 37.0$ | |
| $r_6 = 1.7424$ | | | | |
| | $d_6 = 0.9142$ | $n_4 = 1.4925$ | $\nu_4 = 81.9$ | |
| $r_7 = -2.4077$ | | | | |
| | $d_7 = 0.0348$ | | | |
| $r_8 = \infty$ | | | | |
| | $d_8 = 0.2240$ | $n_5 = 1.80741$ | $\nu_5 = 31.6$ | |
| $r_9 = 2.1129$ | | | | |
| | $d_9 = 0.7117$ | $n_6 = 1.4925$ | $\nu_6 = 81.9$ | |
| $r_{10} = -3.5089$ | | | | |
| | $d_{10} = 3.9211$ | | | |
| $r_{11} = 1.8949$ | | | | |
| | $d_{11} = 0.6848$ | $n_7 = 1.72$ | $\nu_7 = 42.1$ | |
| $r_{12} = -5.0874$ | | | | |
| | $d_{12} = 0.2144$ | $n_8 = 1.6223$ | $\nu_8 = 53.2$ | |
| $r_{13} = 1.2292$ | | | | | wherein reference symbol f represents the focal length of the lens system as a whole, reference symbols $r_1$ through $r_{13}$ respectively represent radii of curvature of respective lens surfaces, reference symbol $d_1$ through $d_{12}$ respectively represent thicknesses of respective lenses and airspaces between respective lenses, reference symbols $n_1$ through $n_8$ respectively represent refractive indices of respective lenses, and reference symbols $\nu_1$ through $\nu_8$ respectively represent Abbe's numbers of respective lenses.

11. A microscope objective according to claim 1, in which said microscope objective has the following numerical data:

| | f = 1.0 W.D. = 0.1608 | | N.A. = 0.7 Petzval's sum = −0.078 | β = −40X |
|---|---|---|---|---|
| $r_1 = -0.5420$ | | | | |
| | $d_1 = 0.9919$ | $n_1 = 1.8061$ | $\nu_1 = 25.8$ | |
| $r_2 = -0.9896$ | | | | |
| | $d_2 = 0.0239$ | | | |
| $r_3 = -6.6031$ | | | | |
| | $d_3 = 0.4225$ | $n_2 = 1.4925$ | $\nu_2 = 81.9$ | |
| $r_4 = -1.3593$ | | | | |
| | $d_4 = 0.0024$ | | | |
| $r_5 = 12.4704$ | | | | |
| | $d_5 = 0.3109$ | $n_3 = 1.58406$ | $\nu_3 = 39.6$ | |
| $r_6 = 1.7989$ | | | | |
| | $d_6 = 0.8657$ | $n_4 = 1.4925$ | $\nu_4 = 81.9$ | |
| $r_7 = -2.3880$ | | | | |
| | $d_7 = 0.0349$ | | | |
| $r_8 = 288.1485$ | | | | |
| | $d_8 = 0.2459$ | $n_5 = 1.80741$ | $\nu_5 = 27.7$ | |
| $r_9 = 2.1463$ | | | | |
| | $d_9 = 0.6913$ | $n_6 = 1.4925$ | $\nu_6 = 81.9$ | |
| $r_{10} = -3.5288$ | | | | |
| | $d_{10} = 4.0225$ | | | |
| $r_{11} = 1.9156$ | | | | |
| | $d_{11} = 0.7460$ | $n_7 = 1.72$ | $\nu_7 = 43.0$ | |
| $r_{12} = -5.1341$ | | | | |
| | $d_{12} = 0.1869$ | $n_8 = 1.6223$ | $\nu_8 = 50.0$ | |
| $r_{13} = 1.2355$ | | | | | wherein reference symbol f represents the focal length of the lens system as a whole, reference symbols $r_1$ through $r_{13}$ respectively represent radii of curvature of respective lens surfaces, reference symbol $d_1$ through $d_{12}$ respectively represent thicknesses of respective lenses and airspaces between respective lenses, reference symbols $n_1$ through $n_8$ respectively represent refractive indices of respective lenses, and reference symbols $\nu_1$ through $\nu_8$ respectively represent Abbe's numbers of respective lenses.

* * * * *